US012417614B2

(12) United States Patent
Kiyama

(10) Patent No.: US 12,417,614 B2
(45) Date of Patent: Sep. 16, 2025

(54) IMAGE PROCESSING DEVICE IS DETECTING A FIRST REPEATED PATTERN FROM IMAGE AND EXTRACTING OBJECT FROM THE FIRST REPEATED PATTERN TO OUTPUT SECOND REPEATED PATTERN, IMAGE PROCESSING METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventor: Ryou Kiyama, Chigasaki Kanagawa (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 285 days.

(21) Appl. No.: 17/932,646

(22) Filed: Sep. 15, 2022

(65) Prior Publication Data
US 2023/0020206 A1 Jan. 19, 2023

Related U.S. Application Data

(63) Continuation of application No. PCT/JP2021/007448, filed on Feb. 26, 2021.

(30) Foreign Application Priority Data

Mar. 23, 2020 (JP) ................. 2020-051048

(51) Int. Cl.
G06V 10/75 (2022.01)
G06V 10/74 (2022.01)
(Continued)

(52) U.S. Cl.
CPC ........ *G06V 10/757* (2022.01); *G06V 10/7515* (2022.01); *G06V 10/759* (2022.01);
(Continued)

(58) Field of Classification Search
None
See application file for complete search history.

(56) References Cited

U.S. PATENT DOCUMENTS 10,708,453 B2 * 7/2020 Mizutani ................... G06F 3/12
2011/0158537 A1 * 6/2011 Uno ..................... G06V 40/161
382/190

(Continued)

FOREIGN PATENT DOCUMENTS

CN 110047089 A 7/2019
JP 2018-160160 A 10/2018
(Continued)

OTHER PUBLICATIONS

Louis et al. [hereafter Louis], Non Patent Literature(NPL) "Repeated Pattern Detection using CNN activations" filed in year 2017.*
(Continued)

*Primary Examiner* — Haris Sabah
(74) *Attorney, Agent, or Firm* — Finnegan, Henderson, Farabow, Garrett & Dunner, LLP

(57) ABSTRACT

According to an embodiment, an image processing device includes one or more processors. The one or more processors are configured to: acquire an image; detect a first repeated pattern from the image; detect an object included in the first repeated pattern; and output the object as a second repeated pattern.

14 Claims, 21 Drawing Sheets

(51) Int. Cl.
    *G06V 10/764*     (2022.01)
    *G06V 10/48*     (2022.01)

(52) U.S. Cl.
    CPC .......... *G06V 10/761* (2022.01); *G06V 10/764* (2022.01); *G06V 10/48* (2022.01)

(56)     References Cited

U.S. PATENT DOCUMENTS

| | | | | |
|---|---|---|---|---|
| 2016/0034782 | A1* | 2/2016 | Nakano | G06V 40/172 |
| | | | | 382/118 |
| 2019/0317441 | A1* | 10/2019 | Honma | G03G 15/5062 |
| 2019/0332905 | A1* | 10/2019 | Nakamura | G06F 3/1285 |
| 2020/0241816 | A1* | 7/2020 | Miyazaki | G06F 3/1234 |

FOREIGN PATENT DOCUMENTS

| | | | |
|---|---|---|---|
| JP | 2019-57260 A | 4/2019 | |
| JP | 2019-57261 A | 4/2019 | |

OTHER PUBLICATIONS

Harshit Agrawal et al., "Detection and Segmentation of Approximate Repetitive Patterns in Relief Images," Proc. of $8^{th}$ Indian Conf. on Computer Vision, Graphics and Image Processing (ICVGIP), Art. 46, 8 pages (2012).

Louis Lettry et al., "Repeated Pattern Detection using CNN activations," IEEE Winter Conf. on Applications of Computer Vision (WACV), 9 pages (2017).

Yoshihiro Fujiwara et al., "Detection of Periodically Repeated Pattern Based on the Similarity of SIFT Feature," Inf. Proc. Soc. of Japan, Proc. of Inf. Sci. and Tech. Forum, pp. 215-216 (2013) and translation, 4 pages.

State Intellectual Property Office of the People's Republic of China, Office Action in CN App. No. 202180023141.3, 9 pages, with machine translation, 10 pages (Apr. 30, 2025).

\* cited by examiner

FIG.12
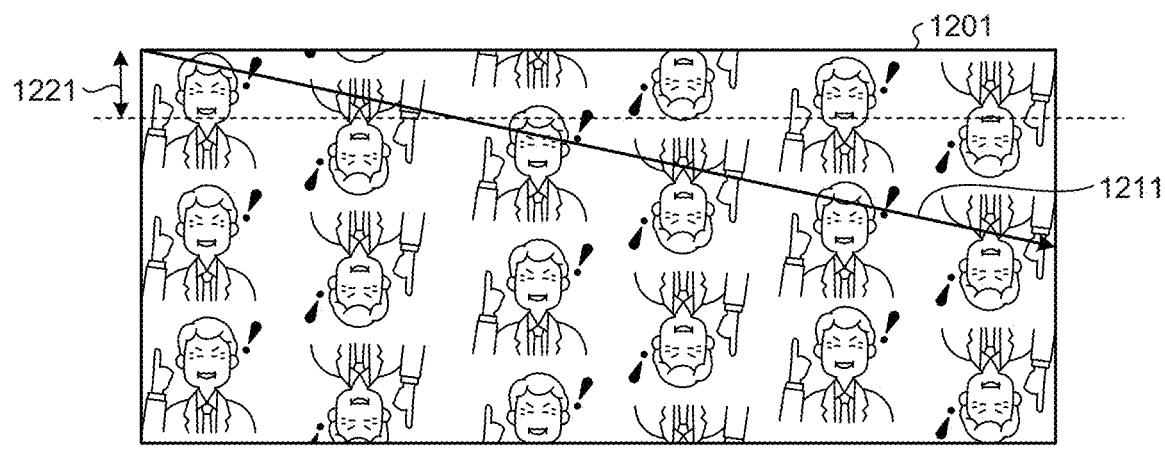
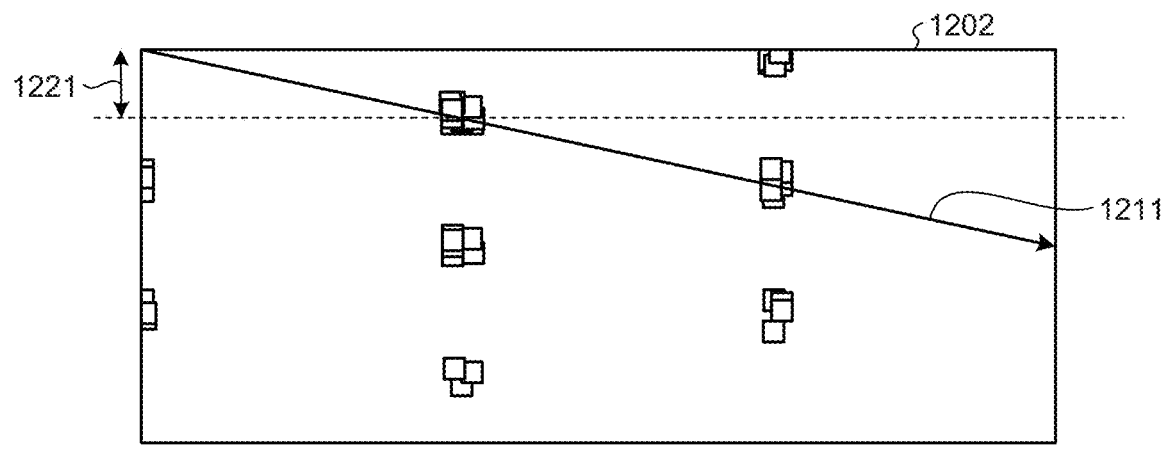

IMAGE PROCESSING DEVICE IS DETECTING A FIRST REPEATED PATTERN FROM IMAGE AND EXTRACTING OBJECT FROM THE FIRST REPEATED PATTERN TO OUTPUT SECOND REPEATED PATTERN, IMAGE PROCESSING METHOD, AND COMPUTER PROGRAM PRODUCT

CROSS-REFERENCE TO RELATED APPLICATIONS

This application is a continuation of PCT International Application No. PCT/JP2021/007448 filed on Feb. 26, 2021 which claims the benefit of priority from Japanese Patent Application No. 2020-051048, filed on Mar. 23, 2020, the entire contents of which are incorporated herein by reference.

FIELD

Embodiments described herein relate generally to an image processing device, an image processing method, and a computer program product.

BACKGROUND

In a typical similar image search, a similar image is searched by extracting a feature of a query image and comparing the feature with a feature of a registered image. In the similar image search including a search of partially similar images, it is possible to search only partially similar images by extracting partial regions in both the query image and the registered image and comparing the extracted partial regions.

Among designs drawn on a plane such as a fabric and a lace material, there is a design in which a design of a certain pattern is repeatedly formed to be arranged vertically or horizontally or both. In the similar image search of an image including such a design, it is desirable to detect repeated patterns and compare the repeated patterns.

However, in the conventional technique, there is a case where a repeated pattern cannot be detected with high accuracy.

BRIEF DESCRIPTION OF THE DRAWINGS

FIG. 12 is a diagram illustrating an example of an image in which a repeated pattern with an excess region is detected;

DETAILED DESCRIPTION

Figure 1:
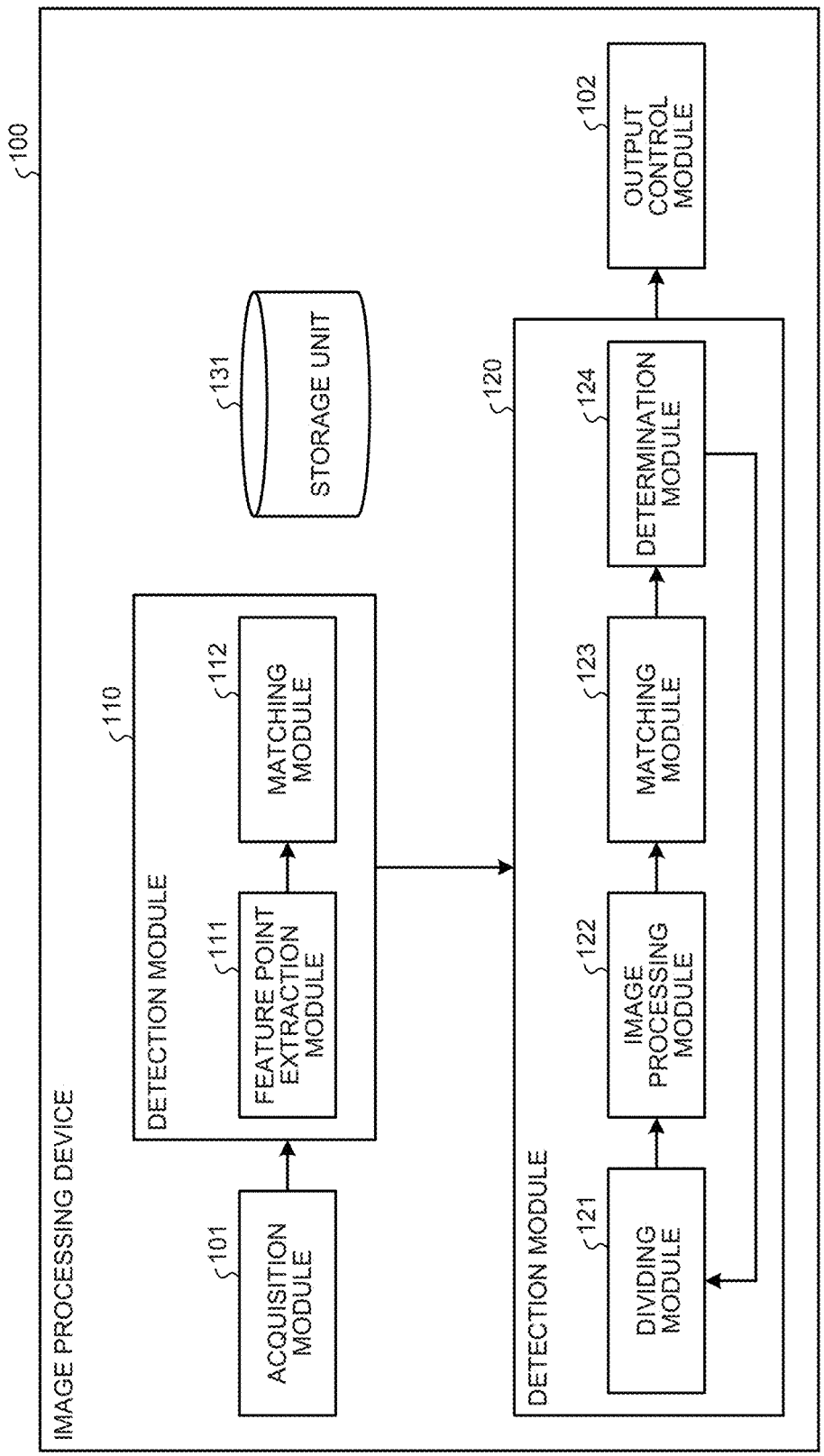
FIG. 1 is a block diagram illustrating an example of a configuration of an image processing device according to a first embodiment.

According to an embodiment, an image processing device includes one or more processors. The one or more processors are configured to: acquire an image; detect a first repeated pattern from the image; detect an object included in the first repeated pattern; and output the object as a second repeated pattern.

Hereinafter, preferred embodiments of an image processing device according to the present disclosure will be described in detail with reference to the accompanying drawings.

As described above, there is a case where a repeated pattern cannot be detected with high accuracy in the conventional technique. For example, in a design drawn on a plane, there is not only a design in which a certain pattern is not simply arranged but a design in which patterns rotated by 180 degrees are alternately arranged, a design in which patterns inverted horizontally or vertically are alternately arranged, and a design in which patterns are arranged in an oblique direction not in a vertical or horizontal direction. In the conventional technique, for example, a partial image including a certain pattern PAT-A and a pattern PAT-B obtained by rotating or inverting the pattern PAT-A can be detected as a repeated pattern, but for example, the patterns PAT-A and PAT-B cannot be detected as repeated patterns.

For example, as a technique of detecting a repeated pattern, a technique of detecting a repeated pattern by performing dense feature point extraction and feature point matching, and then performing patch-level matching and grouping (detection technique TA) is conceivable. However, since such a technique is based on the premise that the shape and orientation of the repeated patterns are the same, it is not possible to detect repeated patterns when the repeated patterns are inverted or rotated.

As another technique for detecting a repeated pattern, a technique (detection technique TB) for detecting a repeated pattern using relative coordinates of an output value of an intermediate layer of a convolutional neural network (CNN)

is conceivable. However, since the output values of the CNN are arranged on a grid, only a repeated pattern arranged vertically or horizontally can be detected. Further, when the repeated pattern is inverted or rotated, the repeated pattern is not detected.

Thus, even when a similar image search is configured to use a repeated pattern detected by such a technology, there is a case where similar images cannot be searched with high accuracy. Note that the technique using a detected repeated pattern is not limited to the similar image search. For example, the technique can also be applied to a technique of learning a machine learning model and a technique of generating learning data for learning a machine learning model on the assumption that a plurality of repeated patterns detected from an image are similar to each other.

First Embodiment

An image processing device according to a first embodiment detects a repeated pattern with improved accuracy. For example, the image processing device of the present embodiment can detect a pattern obtained by inverting or rotating a certain pattern and a pattern arranged in an oblique direction in an image as a repeated pattern.

FIG. 1 is a block diagram illustrating an example of a configuration of an image processing device 100 according to the first embodiment. As illustrated in FIG. 1, the image processing device 100 includes an acquisition module 101, a detection module 110 (first detection module), a detection module 120 (second detection module), an output control module 102, and a storage unit 131.

The acquisition module 101 acquires various types of data to be processed by the image processing device 100, such as an image from which a repeated pattern is to be detected. The acquisition module 101 may acquire data by any method. For example, a method of acquiring data from an external device (server device or the like) via a network, a method of acquiring data by reading data stored in a storage medium, and the like may be applied. The network may be in any form, and is, for example, the Internet, a local area network (LAN), or the like. The network may be wired or wireless.

The detection module 110 detects a repeated pattern (first repeated pattern) from an image. The detection module 110 includes a feature point extraction module 111 and a matching module 112.

The feature point extraction module 111 extracts a plurality of feature points from the image acquired by the acquisition module 101. For example, the feature point extraction module 111 extracts rotation-invariant feature points from the image and calculates a local feature representing the feature of the feature points. For extraction of the feature points and calculation of the local feature, a scale-invariant and rotation-invariant method such as scale-invariant feature transform (SIFT) is used. The method of extracting the feature points and calculating the local feature is not limited to this, and other methods such as speeded-up robust features (SURF) and accelerated KAZE (AKAZE) may also be used.

The local feature of the rotation-invariant feature points includes information indicating an angle (direction). The information indicating an angle may be used, for example, when obtaining a pair of feature points whose angle difference is smaller than a threshold (angle difference threshold).

The matching module 112 performs matching between feature points extracted by the feature point extraction module 111. For example, the matching module 112 performs matching (feature point matching) for each of the plurality of feature points with the other feature points, and detects one or more similar feature points as corresponding points. The feature point matching is processing of associating a plurality of feature points based on the distance (similarity) of the local feature of each feature point. For example, the matching module 112 detects, for each extracted feature point, m (m is an integer of 2 or more) feature points in ascending order of the distance of the local feature among the other feature points as corresponding points. The matching module 112 may detect feature points at which the distance of the local feature is smaller than a threshold (distance threshold) or the similarity of the local feature is larger than a threshold (similarity threshold) as corresponding points.

The detection module 110 detects a repeated pattern based on a relative positional relationship between the detected corresponding points and the corresponding feature points. Hereinafter, the repeated pattern detected by the detection module 110 may be referred to as a repeated pattern PA. Details of a method for detecting the repeated pattern by the detection module 110 will be described later.

The detection module 120 detects an object to be a more detailed repeated pattern from the repeated pattern PA. Hereinafter, the repeated pattern of the object detected by the detection module 120 may be referred to as a repeated pattern PB. The detection module 120 includes a dividing module 121, an image processing module 122, a matching module 123, and a determination module 124.

The dividing module 121 divides the repeated pattern PA into a plurality of partial images. For example, the dividing module 121 divides the repeated pattern PA into N (N is an integer of 2 or more) partial images in the axial direction. The axis is an axis indicating a direction in which the repeated pattern PA is arranged. When the repeated pattern PA is arranged in the lateral direction or the longitudinal direction in the image, the axis is in the lateral direction or the longitudinal direction.

The number of axes may be one or two. For example, when the repeated pattern PA is arranged in both the lateral direction and the longitudinal direction in the image, there are two axes. On the other hand, when the repeated pattern PA is arranged in one of the lateral direction and the longitudinal direction in the image, there is one axis.

The number of divisions (the number N of partial images) may be determined in any manner. For example, the dividing module 121 may be configured to set N=2 in the first division processing, and further repeatedly execute the division processing by increasing N when the repeated pattern PB cannot be obtained. In addition, when there are two axes, which one of the directions of axes to divide may be determined in any manner. For example, the dividing module 121 may be configured to divide the pattern in the direction of one axis and further repeatedly execute the dividing processing in the direction of the other axis when the repeated pattern PB cannot be obtained.

The image processing module 122 executes image processing on a partial image IA (first partial image) included in the plurality of partial images obtained by the division, and outputs an image (processed image) after the image processing. The image processing includes at least one of processing of vertically inverting the partial image IA, processing of horizontally inverting the partial image IA, and processing of rotating the partial image IA.

The matching module 123 performs matching between feature points of the processed image and feature points included in a partial image IB (second partial image) to which image processing is not applied among partial images included in the plurality of partial images. For example, the matching module 123 performs feature point matching for each of the plurality of feature points included in the partial image IB with the feature points included in the processed image, and detects one or more similar feature points as corresponding points. As a method of feature point matching, the same method as in the case of the matching module 112 may be applied.

The matching module 123 can perform matching using information of feature points extracted by the feature point extraction module 111 in the detection module 110. A feature point extraction module that performs the same processing as the feature point extraction module 111 does may be included in the detection module 120, and the matching module 123 may refer to an extraction result by the feature point extraction module.

The determination module 124 determines whether or not the partial images IA and IB are repeated patterns based on the relative positional relationship between the corresponding points detected by the feature point matching and the corresponding feature points. Details of the determination processing by the determination module 124 will be described later.

When it is determined that the partial images IA and IB are not repeated patterns, the detection module 120 changes the division number (N) and repeats the processing after the division processing. The detection module 120 detects the partial images IA and IB determined as the repeated pattern as the objects included in the repeated pattern PA and sends the partial images IA and IB to the output control module 102.

The output control module 102 controls output of various data by the image processing device 100. For example, the output control module 102 outputs the object detected by the detection module 120 as the repeated pattern PB.

The output destination of the repeated pattern PB by the output control module 102 may be changed according to the application. For example, the output control module 102 may output the repeated pattern PB to an external search apparatus that executes similar image search using the repeated pattern. The output control module 102 may output the repeated pattern PB to an external device (learning device, learning data generation device, and the like) that executes learning or learning data generation using the repeated pattern. The image processing device 100 may have a function of an external device.

Each of the above modules (the acquisition module 101, the detection module 110, the detection module 120, and the output control module 102) is realized by, for example, one or more processors. For example, each of the above modules may be realized by causing a processor such as a central processing unit (CPU) to execute a program, that is, by software. Each of the above modules may be realized by a processor such as a dedicated integrated circuit (IC), that is, by hardware. Each of the above units may be realized by using software and hardware in combination. When a plurality of processors are used, each processor may realize one of the modules, or may realize two or more of the modules.

The storage unit 131 stores various data used in each processing by the image processing device 100. For example, the storage unit 131 stores the image acquired by the acquisition module 101 and the divided partial image. The storage unit 131 may be configured by any typical storage medium such as a flash memory, a memory card, a random access memory (RAM), a hard disk drive (HDD), and an optical disc.

Figure 2:
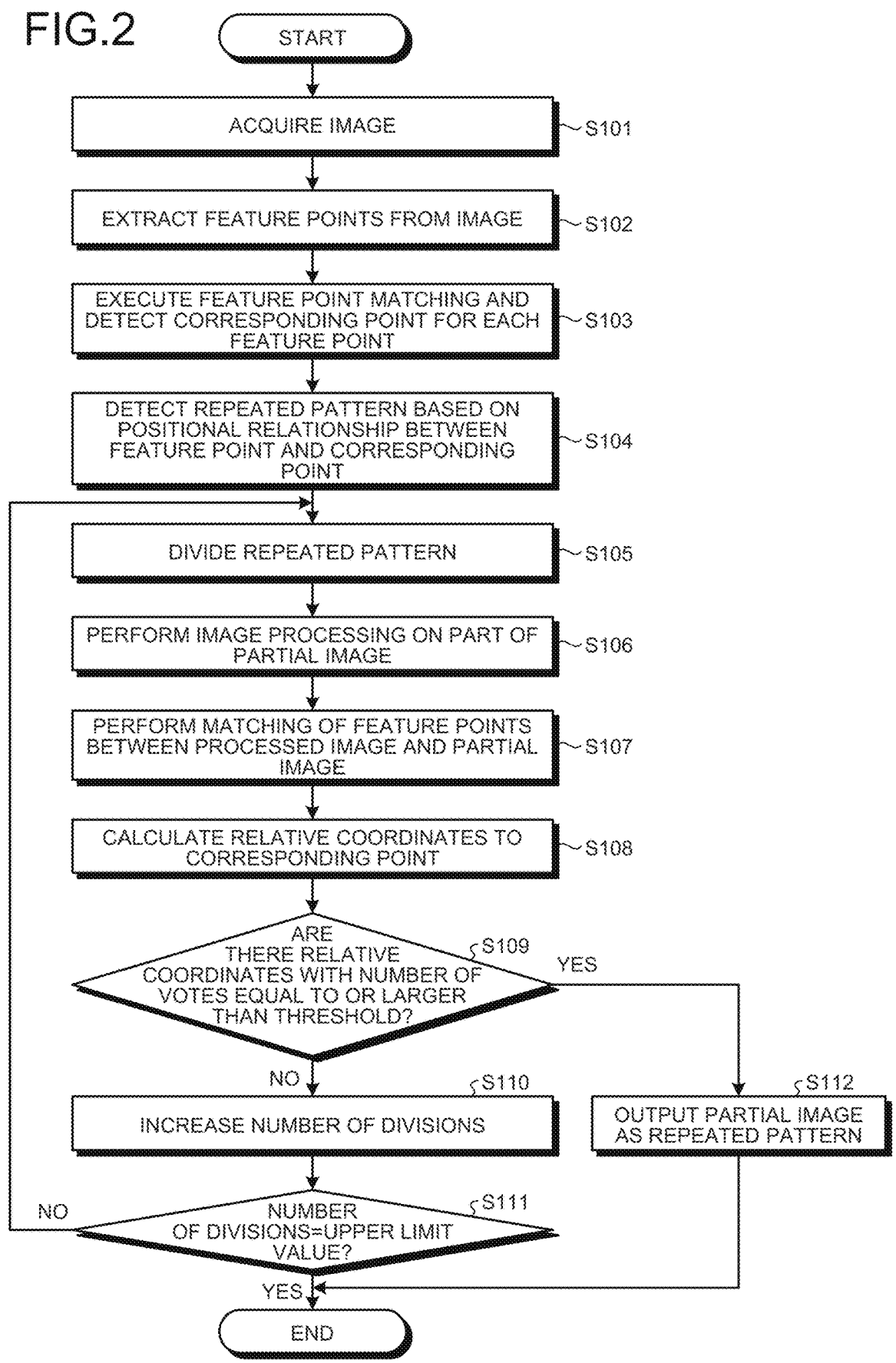
FIG. 2 is a flowchart illustrating an example of detection processing according to the first embodiment.

Next, detection processing of a repeated pattern by the image processing device 100 according to the first embodiment configured as described above will be described. FIG. 2 is a flowchart illustrating an example of detection processing according to the first embodiment.

The acquisition module 101 acquires an image as a target of repeated pattern detection (step S101). The feature point extraction module 111 extracts rotation-invariant feature points from the acquired image (step S102). The feature point extraction module 111 extracts feature points and calculates a local feature using, for example, SIFT.

The matching module 112 executes feature point matching and detects one or more corresponding points for each feature point (step S103). For example, the matching module 112 detects, as corresponding points, top 20 points corresponding to local features close in distance to the local features of the feature points. Hereinafter, a combination of one feature point and one corresponding point is defined as one pair.

Figure 3:
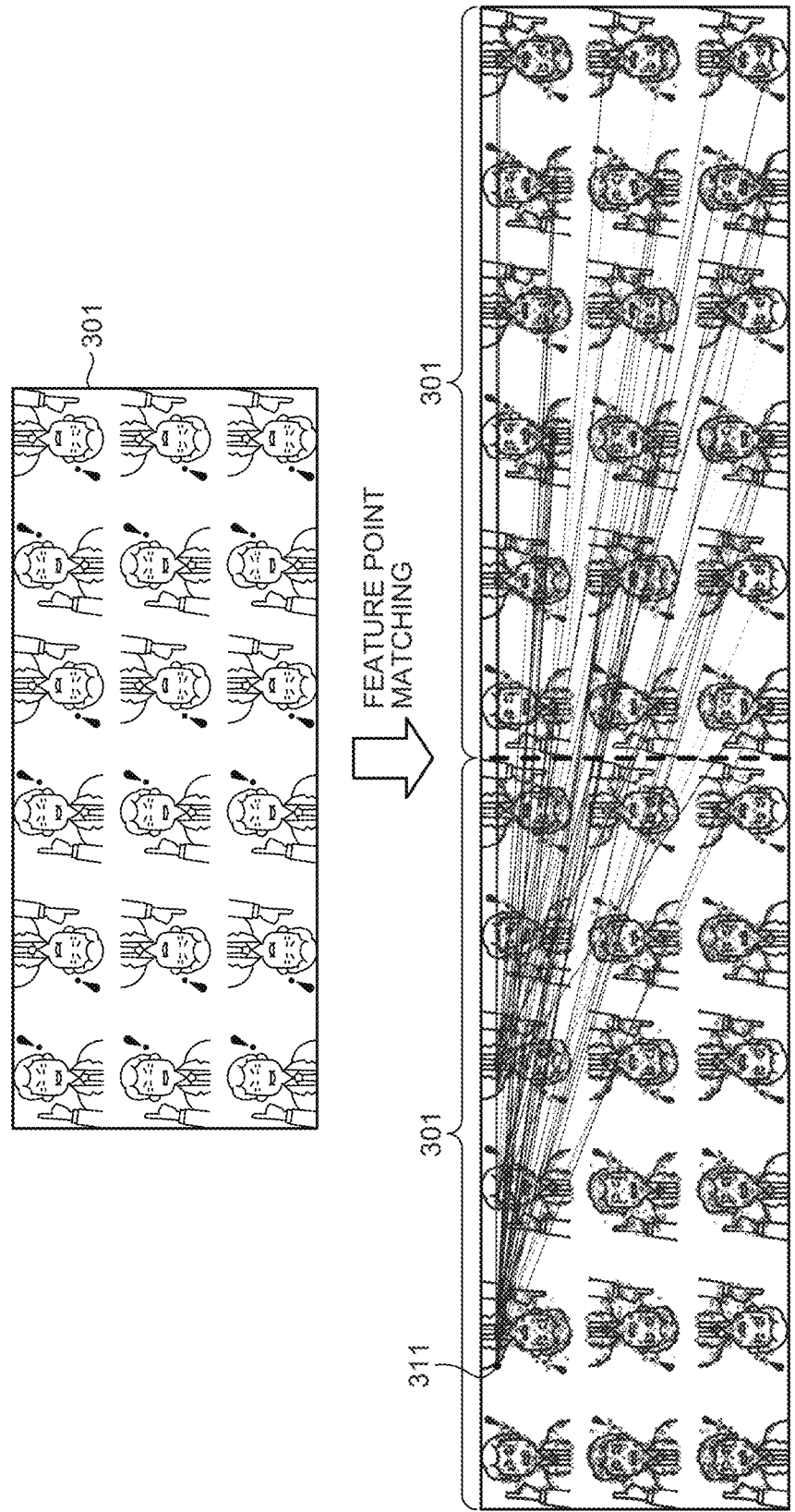
FIG. 3 is a diagram for describing a specific example of feature point matching.

FIG. 3 is a diagram for describing a specific example of feature point matching. An image 301 indicates an image of a target of repeated pattern detection. FIG. 3 illustrates an example in which one feature point 311 in the image 301 is matched with top 20 corresponding points close in distance among the other feature points in the same image 301. Note that, in FIG. 3, for convenience of explanation, the same image 301 is displayed side by side, and only 100 pairs of all the matched pairs are displayed. The feature point 311 and the corresponding points in the image 301 on the right are associated by line segments. Such association (feature point matching) is performed for all feature points in the image 301 on the left. In the example of FIG. 3, the number of feature points in the image 301×20 pairs are obtained.

Returning to FIG. 2, the detection module 110 detects the repeated pattern PA based on the relative positional relationship between the corresponding point and the feature point included in each pair (step S104). Details of the detection processing of the repeated pattern PA by the detection module 110 will be described below.

First, the detection module 110 calculates relative coordinates indicating a relative positional relationship in the image from the feature point to the corresponding point for a pair in which the angle difference between the feature point and the corresponding point is smaller than a threshold (angle difference threshold) among the plurality of pairs. The angle difference represents a difference between an angle included in the local feature of the feature point and an angle included in the local feature of the corresponding point. The relative coordinates correspond to, for example, a difference between the coordinates of the feature point and the coordinates of the corresponding point in a coordinate system having an upper left of the image as an origin and two coordinate axes of a right direction and a lower direction of the image.

Instead of the detection module 110 excluding a pair having an angle difference smaller than the threshold, the matching module 112 may be configured not to match a pair having an angle difference smaller than the threshold.

Figure 4:
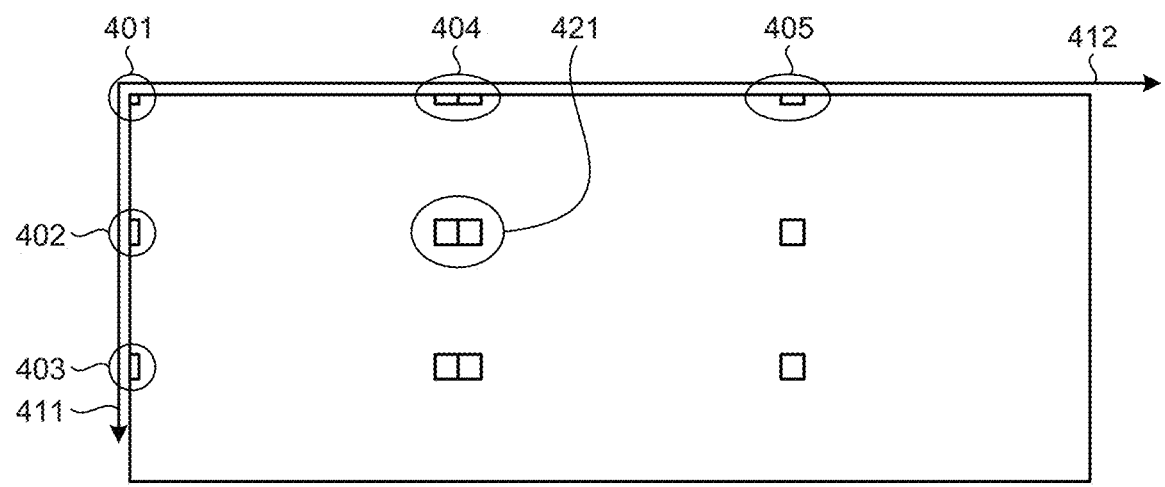
FIG. 4 is a diagram illustrating an example of relative coordinates calculated from an image.

Next, the detection module 110 obtains the number of votes of each of the relative coordinates. The number of votes corresponds to the number of pair for which each value of the relative coordinates is calculated. FIG. 4 is a diagram illustrating an example of the relative coordinates calculated from the image as illustrated in FIG. 3. Axes 411, 412 in FIG. 4 represent coordinate axes for representing relative coordinates. Relative coordinates 401 to 405, 421 are examples of relative coordinates with many votes. The relative coordinates 401 to 405 lie on the axis 411 or 412, while the relative coordinates 421 do not lie on the axes 411, 412.

Figure 5:
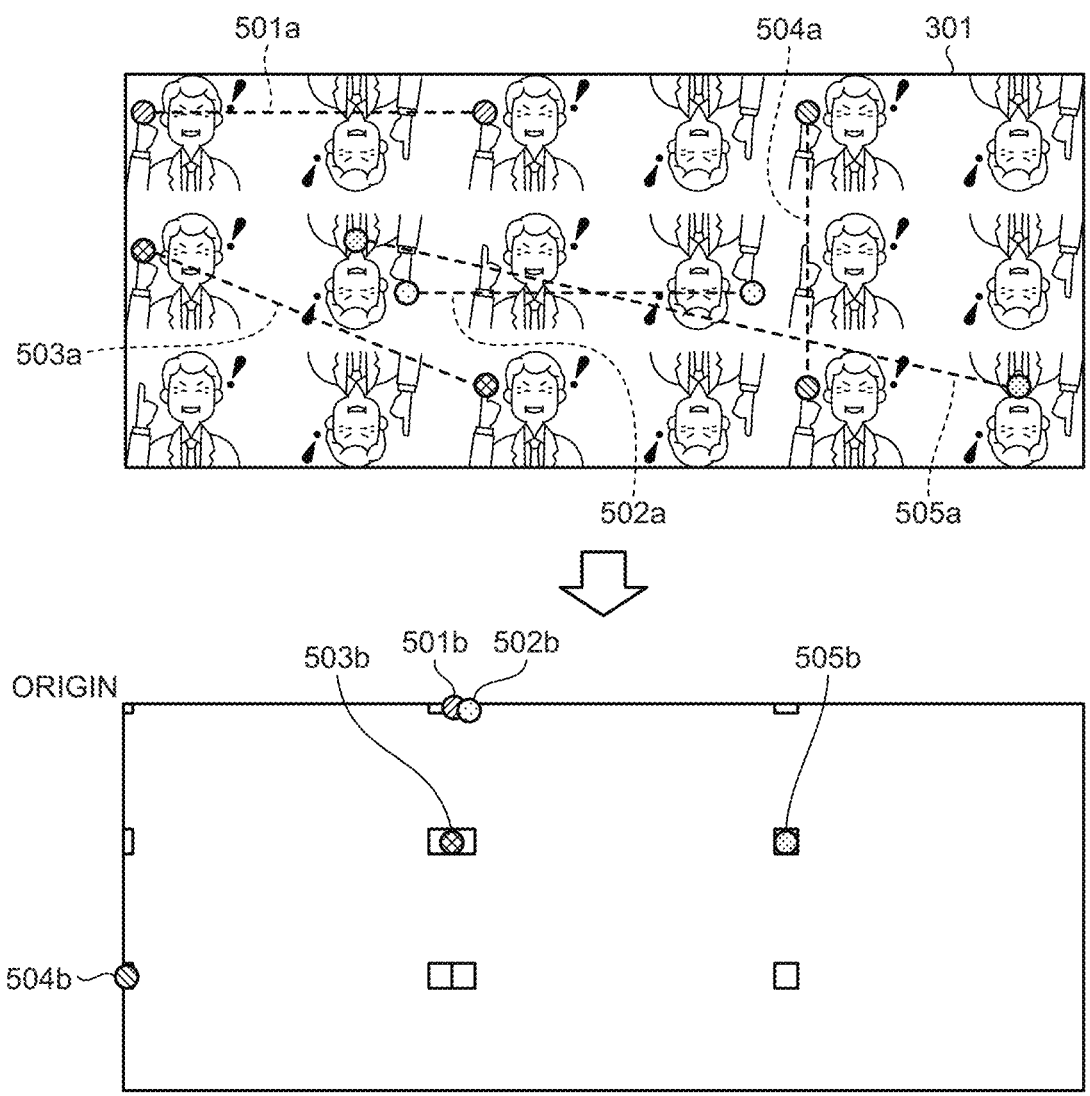
FIG. 5 is a diagram for describing voting of relative coordinates.

FIG. 5 is a diagram for describing voting of the relative coordinates. Line segments 501a to 505a in the image 301 are lines indicating correspondence between the feature point and the corresponding point constituting a certain pair. The difference between the coordinates of both end points of the line segment corresponds to the relative coordinates. When the relative coordinates obtained in this manner are voted, a voting result as illustrated in the lower part of FIG. 5 is obtained. Relative coordinates 501b to 505b are relative coordinates corresponding to the line segments 501a to 505a, respectively.

Figure 6:
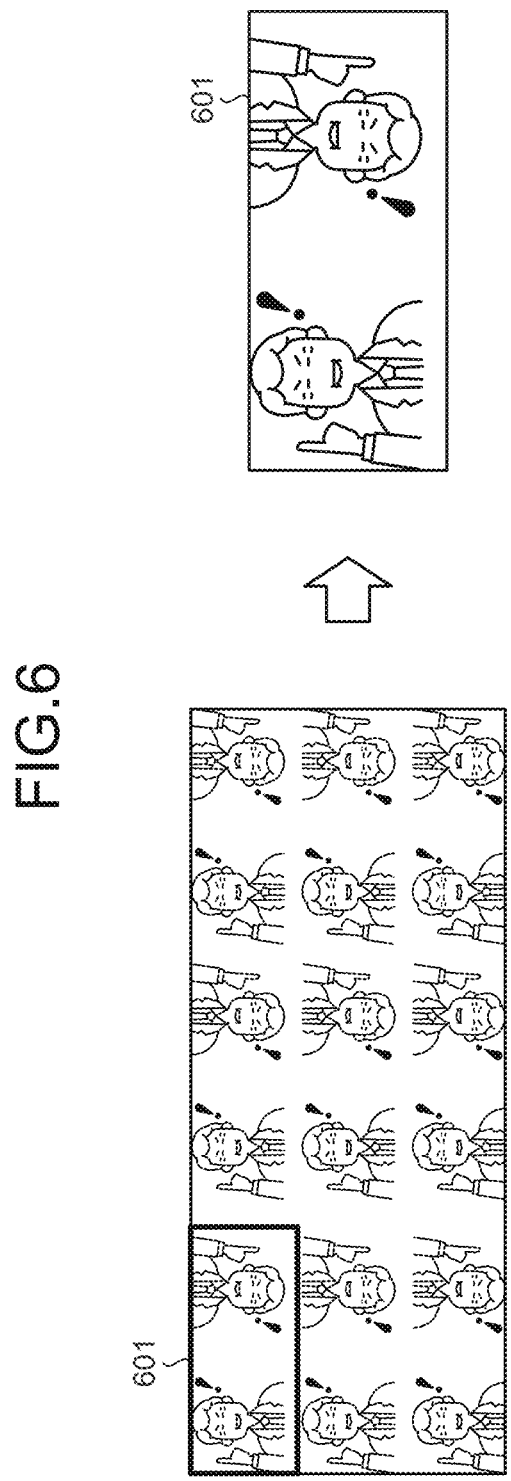
FIG. 6 is a diagram illustrating an example of a repeated pattern.

Next, the detection module 110 obtains relative coordinates that are not located on axes 411, 412 and are closest to the origin among the relative coordinates with a many votes. The relative coordinates with many votes are, for example, relative coordinates with a number of votes larger than a threshold (threshold of the number of votes). The relative coordinates 421 in FIG. 4 and the relative coordinates 503b in FIG. 5 correspond to the relative coordinates obtained in this manner. Then, the detection module 110 detects an image in which a value in the direction of the axis 411 of the obtained relative coordinates is a height and a value in the direction of the axis 412 is a width as the repeated pattern PA. FIG. 6 is a diagram illustrating an example of the repeated pattern PA detected in this manner. An image 601 corresponds to the detected repeated pattern PA.

Using a pair having a small angle difference means that the repeated pattern PA is obtained without considering rotation or the like, in other words, the repeated pattern PA is detected in a unit larger than the finally obtained repeated pattern PB in consideration of rotation or the like.

By setting the image corresponding to the relative coordinates closest to the origin as the repeated pattern PA, the minimum repeated patterns at this stage can be obtained. Although the start point of the repeated pattern PA is set as the origin, a point closest to the origin among the feature points or the corresponding points may be set as the start point.

As a technique for detecting a repeated pattern, for example, there is a technique based on a result of frequency analysis on an image. However, in such a technique, a fine mesh pattern may be detected. For example, when a repeated pattern is detected from an image such as fabric, a fine mesh pattern may be detected as a repeated pattern instead of a large pattern that a person can recognize as a design. In the detection processing by the detection module 110, since the repeated pattern is detected based on the feature points extracted from the image, a larger pattern that is desirably recognized as a design rather than a fine mesh pattern can be detected as a repeated pattern. That is, even with only the detection processing by the detection module 110, it is possible to detect a repeated pattern with improved accuracy as compared with the conventional technique.

In the present embodiment, the detection module 120 further detects an object that may be a repeated pattern from the repeated pattern PA. Returning to FIG. 2, processing by the detection module 120 will be described.

Figure 7:
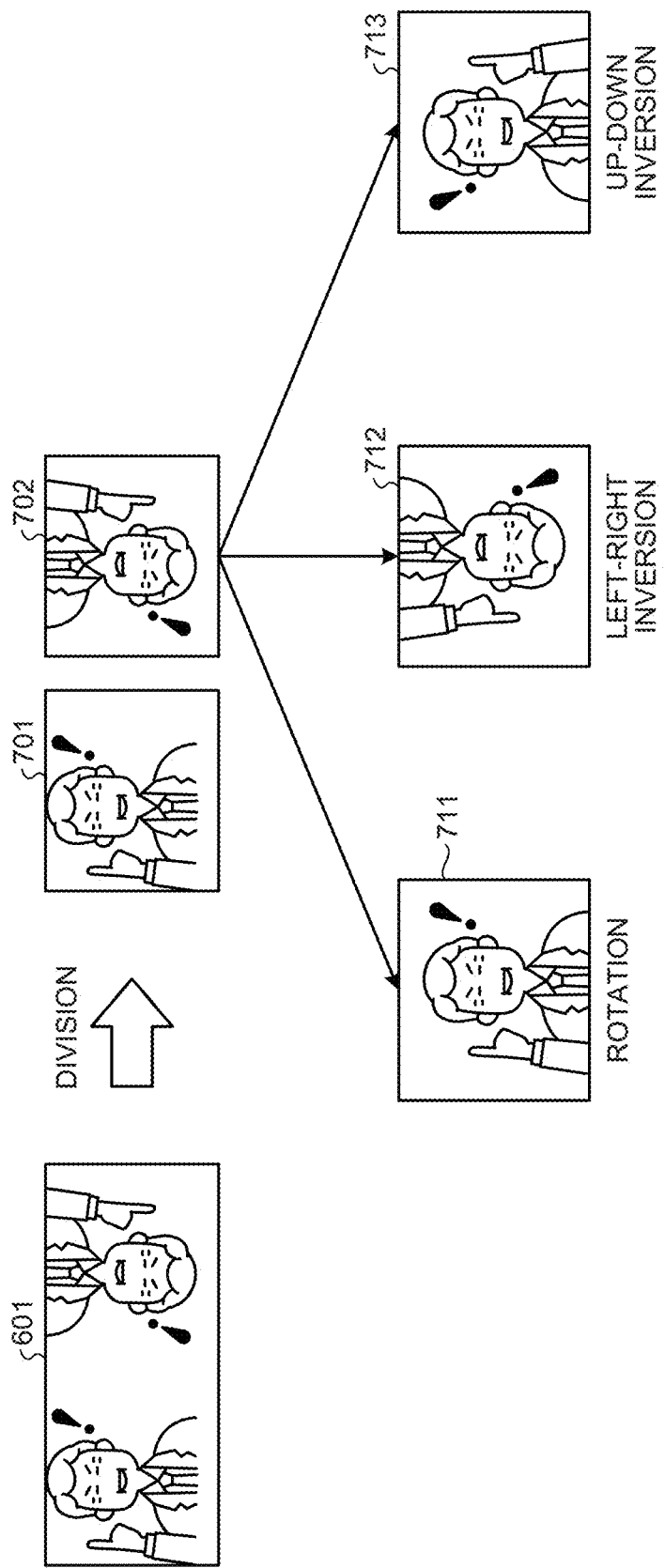
FIG. 7 is a diagram illustrating an example of division of a repeated pattern.

The dividing module 121 included in the detection module 120 divides the repeated pattern PA into N partial images in the lateral direction or the longitudinal direction (step S105). FIG. 7 is a diagram illustrating an example of division of the repeated pattern PA. FIG. 7 illustrates an example in which an image 601 (repeated pattern PA) obtained in FIG. 6 is divided into two (N=2) partial images 701, 702 in the lateral direction. In the example of FIG. 7, the partial image 701 corresponds to the partial image IB to which the image processing is not applied, and the partial image 702 corresponds to the partial image IA to which the image processing is applied.

Returning to FIG. 2, the image processing module 122 performs image processing such as 180-degree rotation, left-right inversion, and up-down inversion on one of the partial images (step S106). In FIG. 7, images 711, 712, and 713 represent images (processed images) after the partial image 702 is rotated by 180 degrees, horizontally inverted, and vertically inverted, respectively. For example, a predetermined value is used as the rotation angle. The number of rotation angles is not limited to one, and may be plural (for example, 2 or more of 45 degrees, 90 degrees, 180 degrees, and 270 degrees). The image processing module 122 may execute a part or all of such image processing.

Returning to FIG. 2, the matching module 123 performs matching of the feature points included in the partial image 701 to which the image processing is not applied and the feature points of the processed image, and detects one or more similar feature points in the processed image as corresponding points (step S107).

The determination module 124 calculates relative coordinates indicating a relative positional relationship between the corresponding points detected by the feature point matching and the corresponding feature points (step S108). The determination module 124 determines whether or not the divided partial image is a repeated pattern based on the voting result of the calculated relative coordinates. For example, the determination module 124 determines whether there are relative coordinates with which the number of votes is equal to or larger than a threshold (step S109).

When there are relative coordinates with which the number of votes is equal to or larger than the threshold (step S109: Yes), the detection module 120 detects the partial images 701, 702 including the feature points corresponding to the relative coordinates as objects included in the repeated pattern PA and sends the partial images to the output control module 102. The output control module 102 outputs the received object as the repeated pattern PB (step S112) and ends the detection processing.

Figure 8:
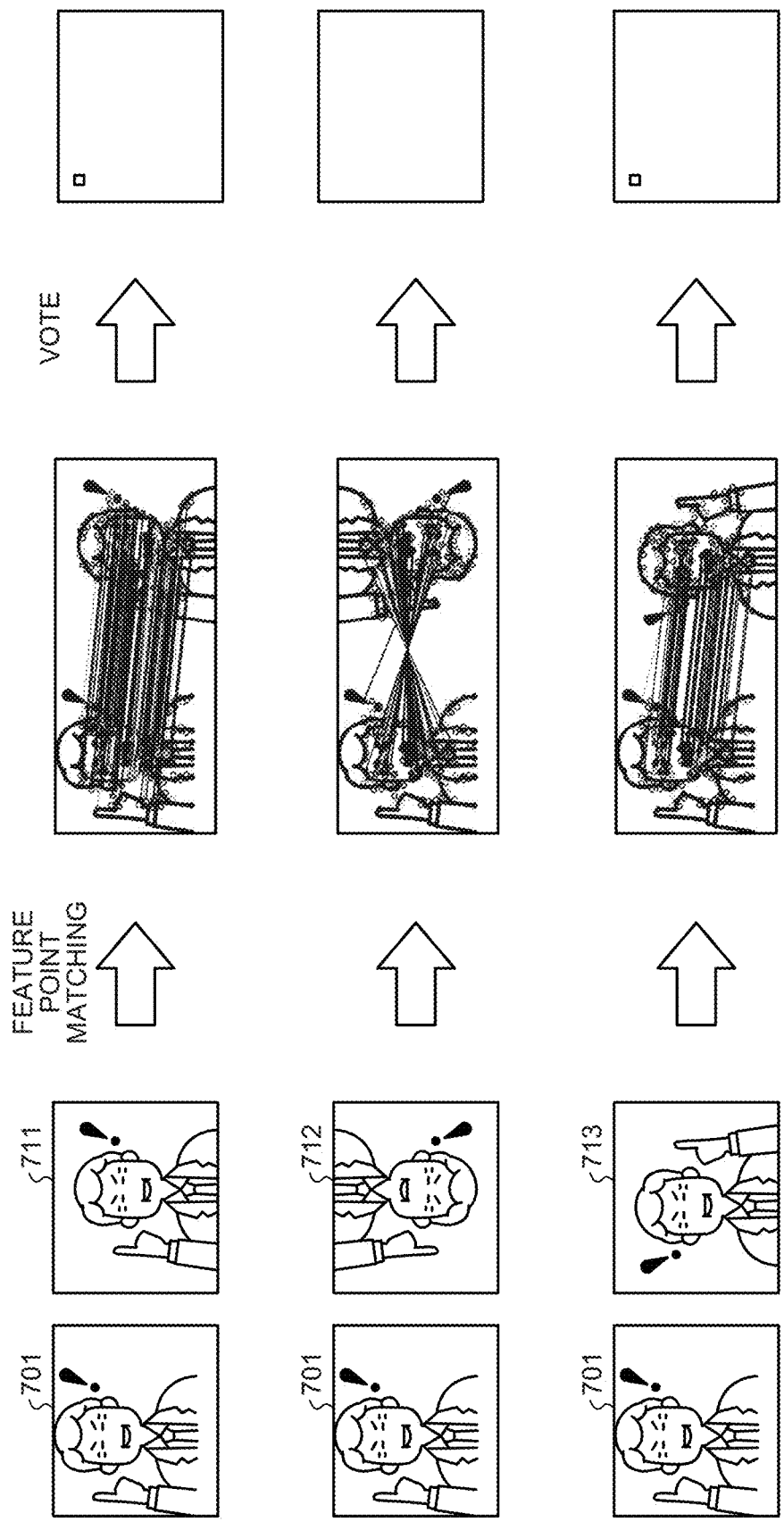
FIG. 8 is a diagram for describing a specific example of feature point matching and voting of relative coordinates.

FIG. 8 is a diagram for describing a specific example of feature point matching and voting of relative coordinates (steps S107 to S109). FIG. 8 illustrates an example of feature point matching with the images 711, 712, and 713 that are the processed images illustrated in FIG. 7 and voting results. In the example of FIG. 8, relative coordinates with many votes are calculated by feature point matching between the partial image 701 and the image 711 and between the partial image 701 and the image 713. Thus, the determination module 124 determines that the partial images 701, 702 are repeated patterns.

Returning to FIG. 2, when there is no relative coordinates with which the number of votes is equal to or larger than the threshold (step S109: No), the detection module 120 increases the number of divisions of the partial image (step S110). The detection module 120 determines whether or not the number of divisions has reached a predetermined upper limit value (step S111). When the detection amount has reached the upper limit value (step S111: Yes), the detection module 120 ends the detection processing. When the number of divisions does not reach the upper limit (step S111: No), the dividing module 121 divides the image according to the new number of divisions and repeats the processing (step S105).

Instead of determining the end by the number of divisions, the end may be determined for example by the number of times of the repeat processing after the step S105.

Figure 9:
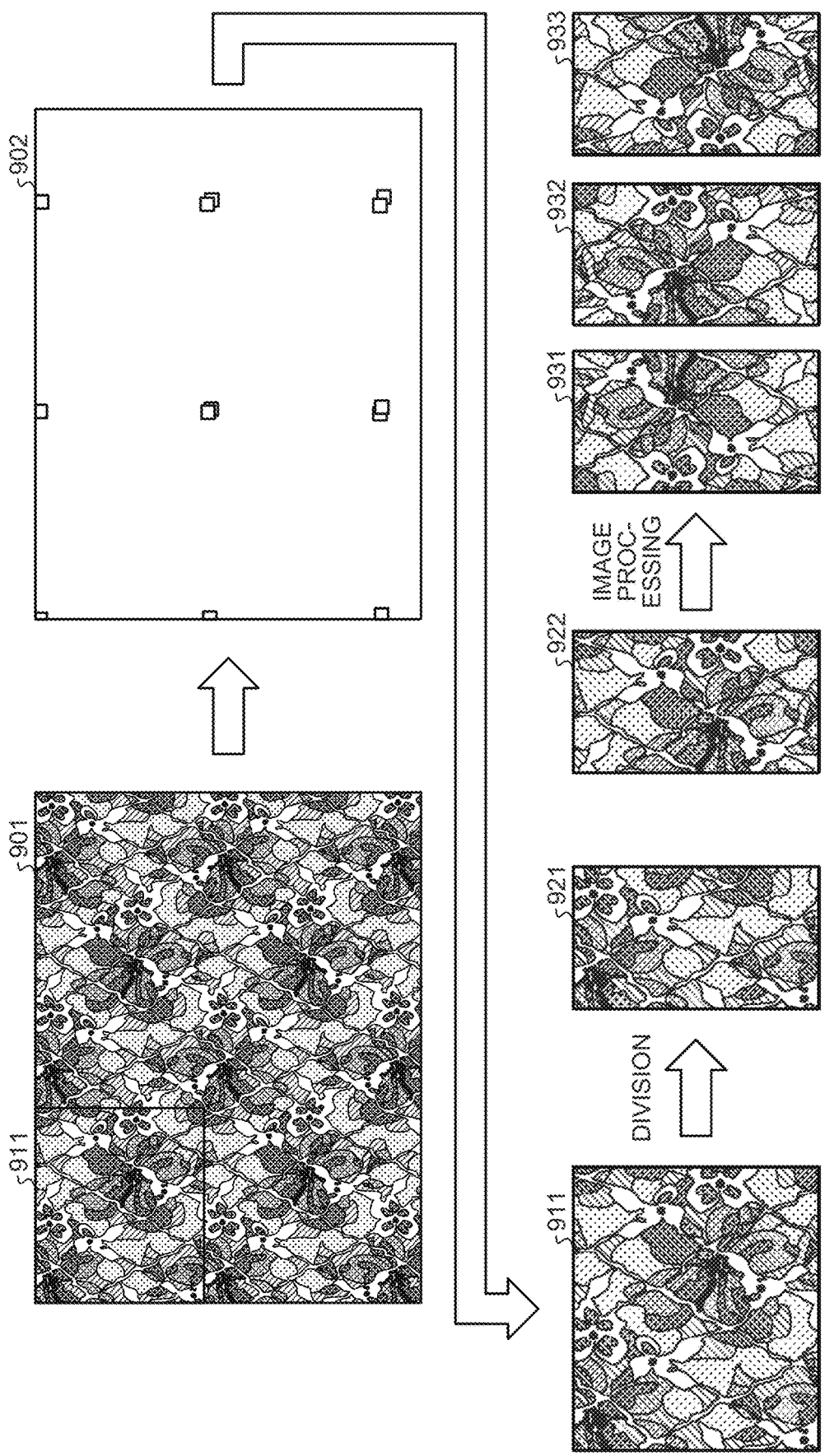
FIG. 9 is a diagram illustrating an example of detecting a repeated pattern from an image of a fabric (lace material)

FIG. 9 is a diagram illustrating an example of detecting a repeated pattern from an image of a fabric (lace material). An image 901 corresponds to an image obtained by imaging the lace material. From the image 901, a voting result with relative coordinates as shown in a voting result 902 is obtained. From the voting result 902, an image 911 is detected as the repeated pattern PA.

The dividing module 121 divides the image 911 into two partial images 921, 922. The image processing module 122 applies image processing of rotation, up-down inversion, and left-right inversion to the partial image 922 and outputs processed images 931, 932, and 933. In the example of FIG. 9, since the processed image 932 vertically inverted is similar to the partial image 921, the partial images 921, 922 are detected as the repeated patterns PB. The processed image 932 is an image shifted in the vertical direction with respect to the partial image 921 by an amount corresponding to relative coordinates with many votes.

In this manner, according to the present embodiment, it is possible to detect a repeated pattern from an image such as a fabric with improved accuracy.

The method of detecting a repeated pattern by the detection module 110 is not limited to the method described above, and any method may be used. For example, the detection module 110 may detect a repeated pattern by the detection technologies TA, TB described above. In the present application, the detection module 120 further detects an object to be a repeated pattern from the repeated pattern detected by the detection module 110. Thus, regardless of the method of detection by the detection module 110, it is possible to detect a repeated pattern with improved accuracy through the detection processing of the detection module 120.

First Modification

In the above embodiment, the image processing module 122 rotates the image by a predetermined rotation angle. The rotation angle may be determined from information on an angle difference between the feature point and the corresponding point included in a pair obtained by feature point matching by the matching module 112. For example, the image processing module 122 calculates an angle difference for each pair and obtains a distribution of the angle differences. The image processing module 122 determines the angle difference with high frequency as the rotation angle.

Figure 10:
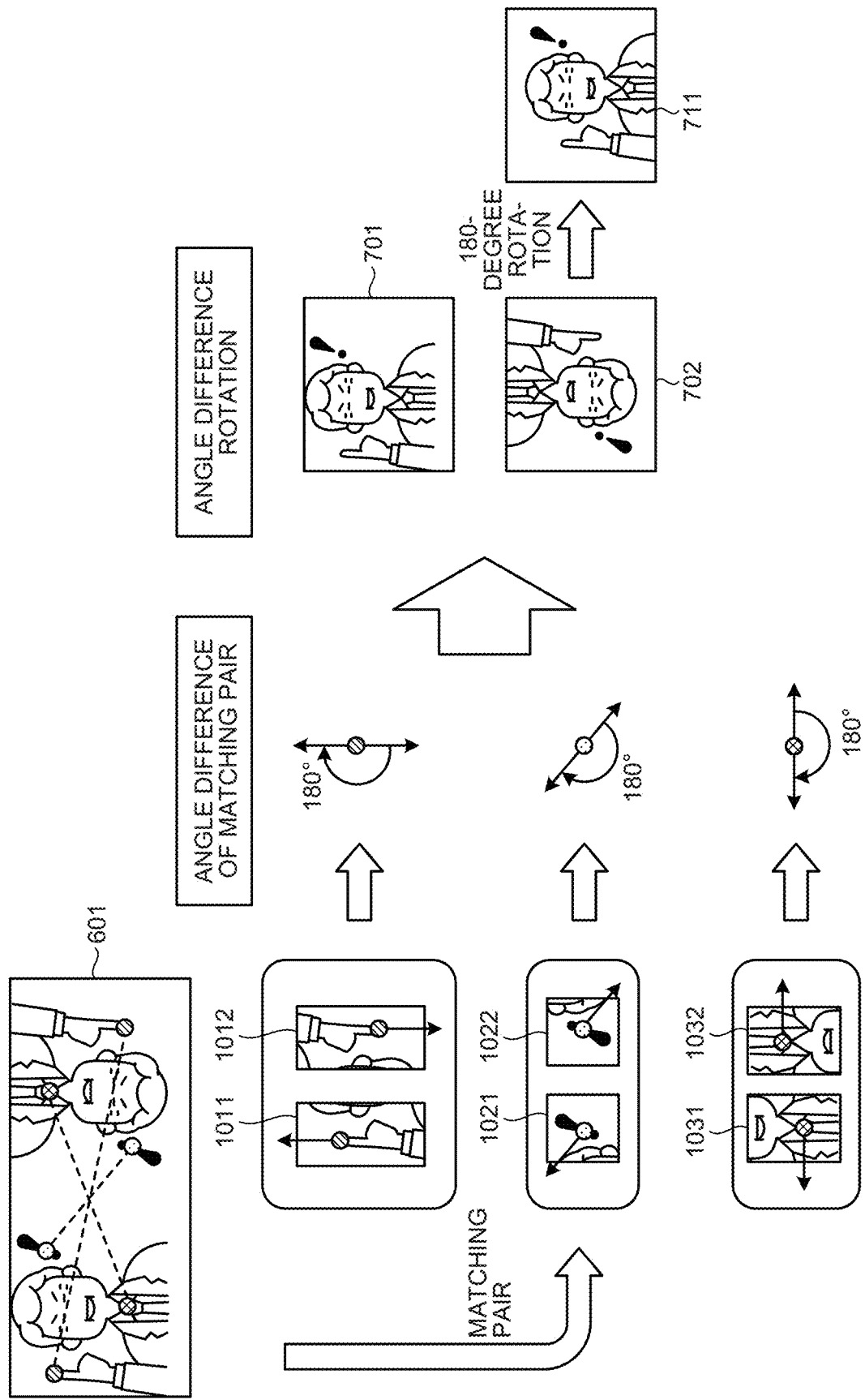
FIG. 10 is a diagram illustrating an example of rotation angle determination processing.

FIG. 10 is a diagram illustrating an example of processing of determining the rotation angle in this manner. The matching pair represents a pair in which the feature point and the corresponding point in the image 601 (repeated pattern PA) are associated with each other. Images 1011, 1021, and 1031 are examples of images including feature points. The images 1012, 1022, and 1032 are examples of images including corresponding points associated with the images 1011, 1021, and 1031, respectively. The angle difference with respect to these matching pairs is any 180 degrees. Thus, the image processing module 122 determines the rotation angle to be 180 degrees and rotates the partial image 702 by 180 degrees to output the image 711.

Second Modification

In the above embodiment, the dividing module 121 performs a division so that the scale ratios among the plurality of partial images after the division match each other. When the sizes of the plurality of objects included in the repeated pattern PA are substantially the same, an object that may be the repeated pattern PB can be appropriately detected by such a dividing method. However, when the difference in size between the plurality of objects included in the repeated pattern PA is large, there is a possibility that the object cannot be detected unless the position to be divided is appropriately determined according to the difference.

Thus, in the second modification, the ratio of the sizes (scale ratio) between the partial images to be divided is determined using the ratio of the scale included in the local feature for the pair in which the feature point and the corresponding point in the repeated pattern PA are associated with each other. Thus, in the second modification, a method of extracting scale-invariant feature points such as SIFT, SURF, and AKAZE is applied. The local feature of the scale-invariant feature points includes information indicating a scale.

Figure 11:
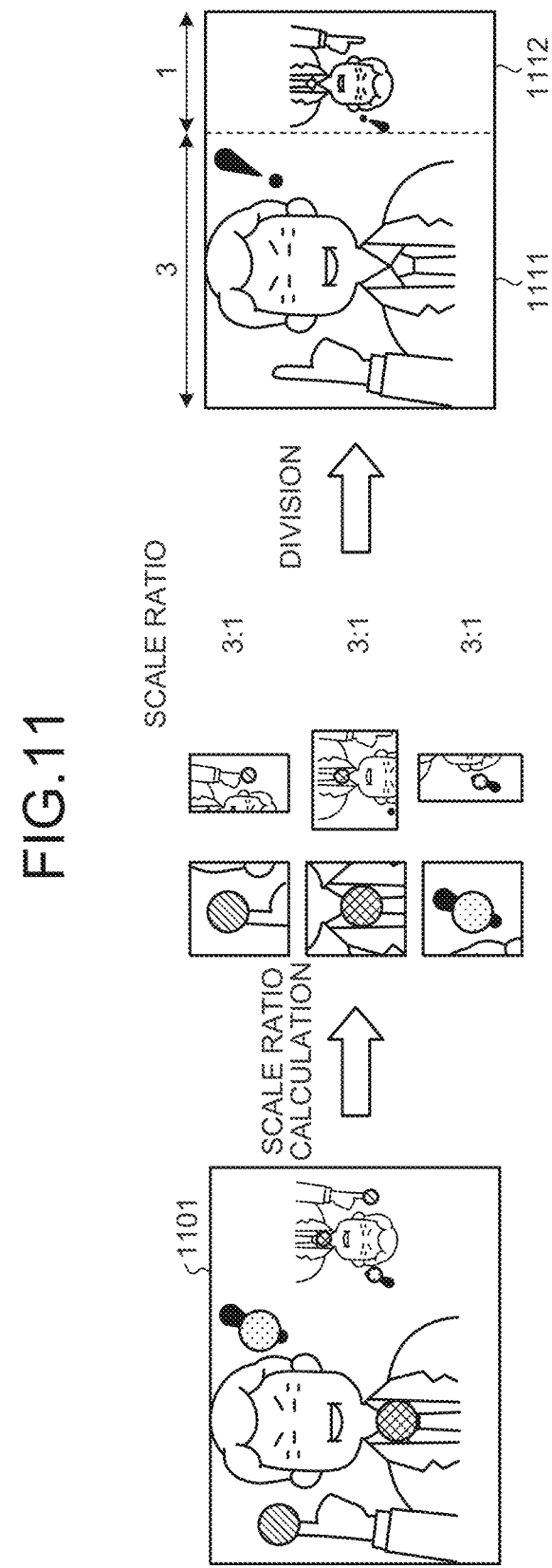
FIG. 11 is a diagram for describing an example of scale ration determination processing.

FIG. 11 is a diagram for describing an example of scale ratio determination processing. An image 1101 is an example of the repeated pattern PA including a plurality of objects having different scale ratios. For example, the dividing module 121 calculates the scale ratio that is a ratio of the scale included in the local feature for each of pairs in which the feature point and the corresponding point in the image 1101 are associated with each other. In the example of FIG. 11, a scale ratio of "3:1" is calculated for all three pairs. The dividing module 121 determines the scale ratio of a plurality of partial images to be divided at the calculated scale ratio, divides the repeated pattern PA at the determined scale ratio, and outputs partial images 1111, 1112.

Third Modification

The repeated pattern PA may be detected in which a plurality of objects are arranged to be gradually shifted in the direction of any axis. In such a case, a partial image obtained by simply dividing the repeated pattern PA includes an excess region by the positional shift. Thus, a partial image corrected to delete the excess region may be detected as an object in the repeated pattern PA.

Such a situation may occur when the repeated pattern PA is arranged in an oblique direction in the image. To cope with such a situation, for example the detection module 110 may have a function of calculating the amount of positional shift.

FIG. 12 is a diagram illustrating an example of an image 1201 in which a repeated pattern with an excess region is detected. A voting result 1202 is an example of the voting result obtained from the image 1201. An arrow 1211 indicates directions in which the repeated patterns PA are arranged. For example, the detection module 110 calculates an amount of positional shift 1221 from values of relative coordinates closest to the origin, the coordinates being not on the vertical and horizontal axes passing through the origin. In FIG. 12, an example in which the shift is gradually made in the longitudinal direction has been described. However, even when the shift is gradually made in the lateral direction, the amount of positional shift in the lateral direction can be calculated in the same procedure.

Figure 13:
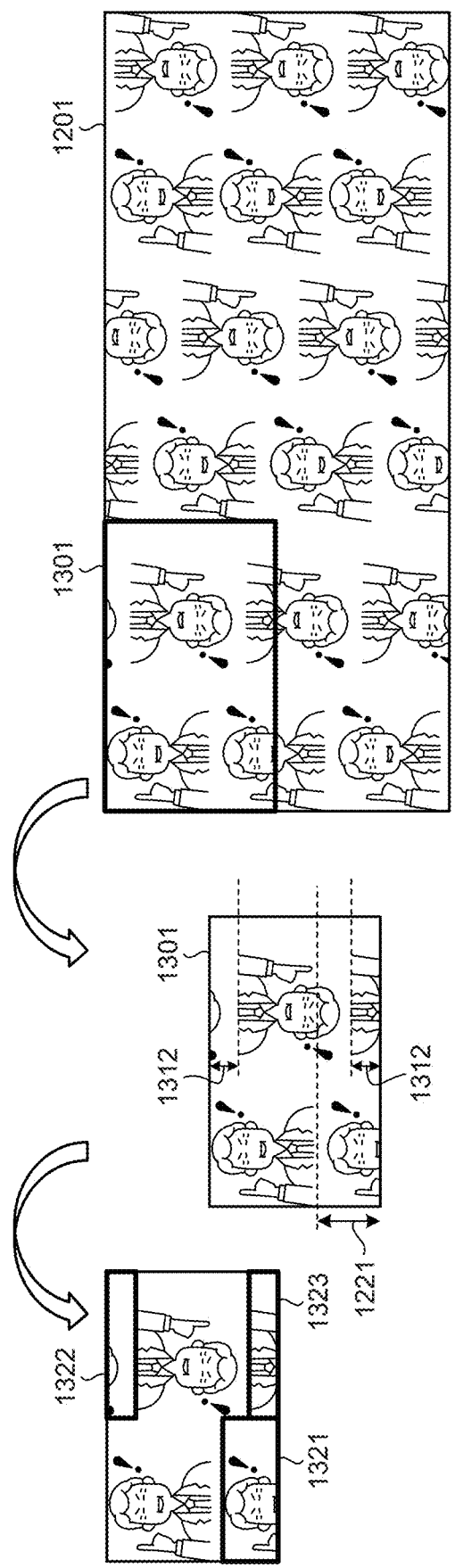
FIG. 13 is a diagram illustrating an example of correction of a partial image based on an amount of positional shift.
Figure 14:
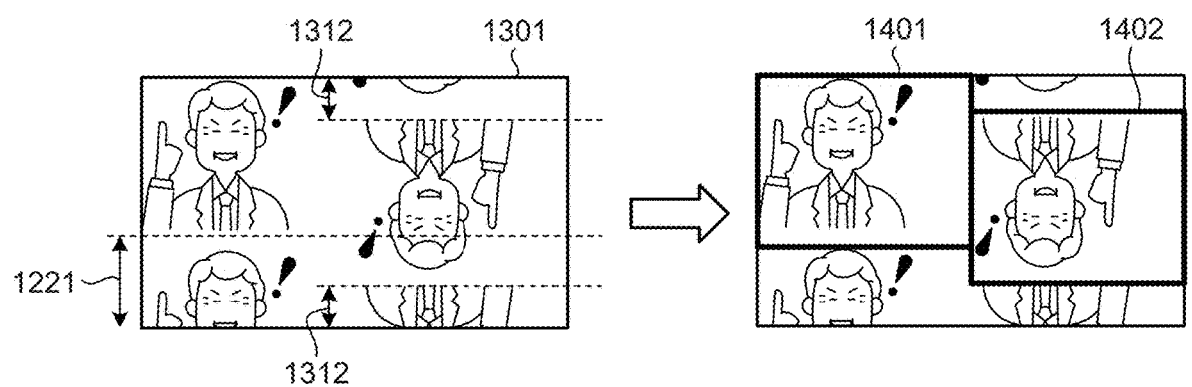
FIG. 14 is a diagram illustrating an example of correction of a partial image based on an amount of positional shift.

FIGS. 13 and 14 are diagrams illustrating an example of correction of a partial image based on the amount of positional shift. A repeated pattern 1301 is an example of the repeated pattern PA detected from the image 1201. An excess region 1321 corresponding to the amount of positional shift 1221 is included in a lower part of the left region in the repeated pattern 1301. The upper and lower parts of the right region in the repeated pattern 1301 include excess regions 1322, 1323 each corresponding to a length 1312 that is half of the amount of positional shift 1221.

Thus, as illustrated in FIG. 14, for example the image processing module 122 generates a partial image 1401 in which the region 1321 is deleted from the left partial image of the two partial images obtained by dividing the repeated pattern 1301 into two. In addition, the image processing module 122 generates a partial image 1402 in which the regions 1322, 1323 are deleted from the right partial image of the two partial images.

Fourth Modification

In the above embodiment, a case where the repeated pattern PA is arranged in both the lateral direction and the longitudinal direction in the image (case where there are two axes) has been mainly described. As described above, the repeated pattern PA may be arranged in one of the lateral direction and the longitudinal direction in the image. In the fourth modification, an example in which the repeated pattern PA is arranged in the lateral direction in the image will be described. Repeated patterns arranged in the longitudinal direction can also be detected by the same procedure.

Figure 15:
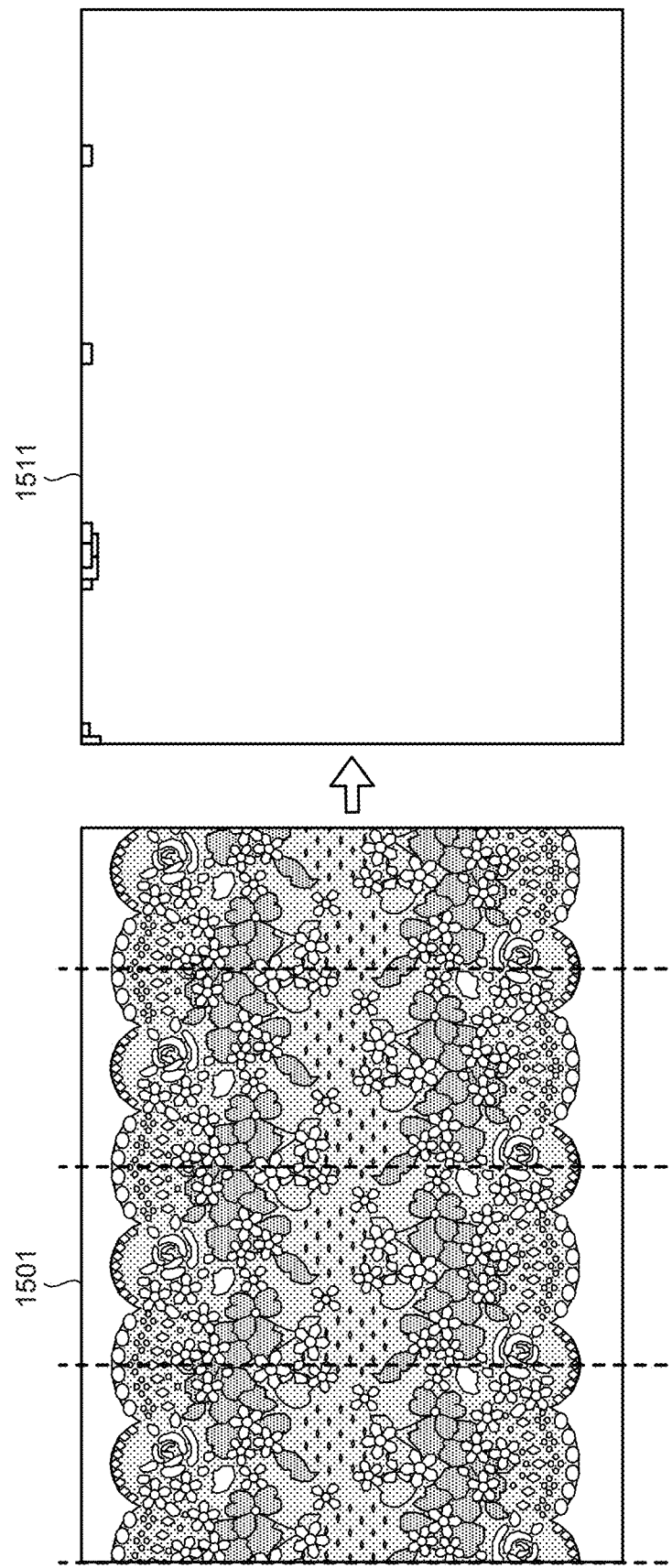
FIG. 15 is a diagram illustrating an example of a repeated pattern arranged in a lateral direction.

FIG. 15 is a diagram illustrating an example of a repeated pattern arranged in the lateral direction. An image 1501 illustrated in FIG. 15 is an example of an image in which the repeated pattern PA is not rectangular but in a band shape. When voting is performed on such an image 1501, relative coordinates with many votes are distributed on an axis in the lateral direction.

Figure 16:
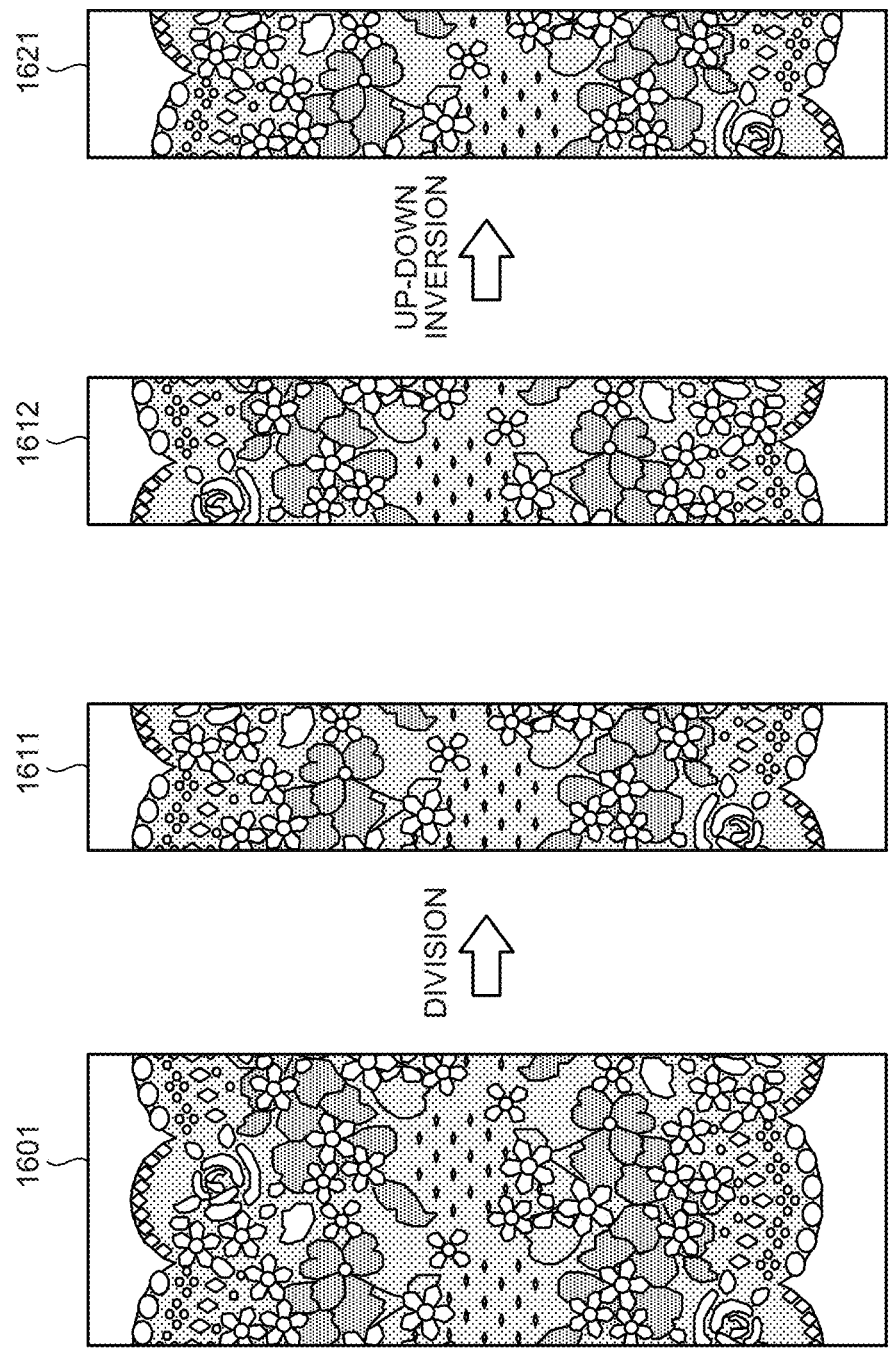
FIG. 16 is a diagram illustrating an example of a repeated pattern.

When the relative coordinates are located only on an axis as described above, the detection module 110 determines that the pattern is a repeated pattern arranged in one direction and obtains the relative coordinates closest to the origin among the relative coordinates with many votes. Relative coordinates 1511 are relative coordinates obtained in this manner. The detection module 110 detects an image having the same height as that of the image 1501 as the repeated pattern PA with the obtained value of the relative coordinates in the axis direction as a width. FIG. 16 is a diagram illustrating an example of the repeated pattern PA detected in this manner. An image 1601 corresponds to the detected repeated pattern PA.

The dividing module 121 divides the repeated pattern PA into a plurality of partial images. For example, the dividing module 121 divides the repeated pattern PA into N (N is an integer of 2 or more) partial images in the axial direction. FIG. 16 illustrates an example in which partial images 1611, 1612 are obtained by a division into two in the lateral direction. The image processing module 122 generates a processed image 1621 by vertically inverting the partial image 1612, for example. In this example, since the partial image 1611 is similar to the processed image 1621, the partial images 1611, 1612 are detected as objects included in the repeated pattern PA.

In this manner, the image processing device according to the first embodiment divides the repeated pattern detected from the image, performs image processing such as rotation or inversion on the partial image obtained by the division, and further detects a more detailed repeated pattern included in the repeated pattern with reference to the image after the image processing. This enables a repeated pattern to be detected with improved accuracy.

Second Embodiment

An image processing device according to a second embodiment detects an object (figure) included in an image and detects an object that may be a more detailed repeated pattern from a repeated pattern detected from the image with reference to a detection result.

Figure 17:
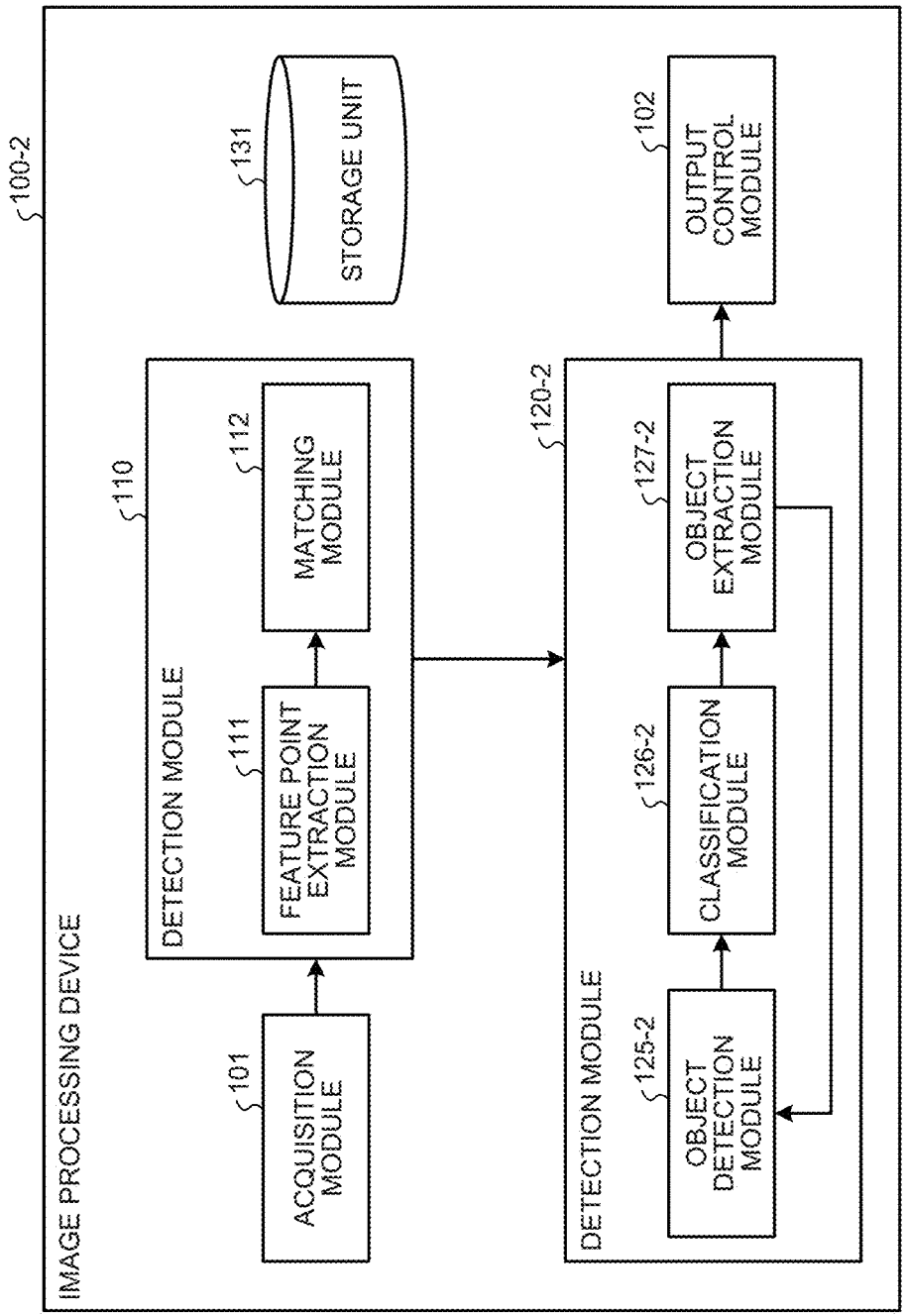
FIG. 17 is a block diagram illustrating an example of a configuration of an image processing device according to a second embodiment.

FIG. 17 is a block diagram illustrating an example of a configuration of an image processing device 100-2 according to the second embodiment. As illustrated in FIG. 17, the image processing device 100-2 includes the acquisition module 101, the detection module 110, a detection module 120-2, the output control module 102, and the storage unit 131.

The second embodiment is different from the first embodiment in the function of the detection module 120-2. Other configurations and functions are the same as those in FIG. 1 which is a block diagram of the image processing device 100 according to the first embodiment, and thus, they are denoted by the same reference numerals, and description thereof is omitted here.

The detection module 120-2 includes an object detection module 125-2, a classification module 126-2, and an object extraction module 127-2.

The object detection module 125-2 detects a plurality of objects from the image acquired by the acquisition module 101. For example, the object detection module 125-2 executes extraction processing on the image and obtains a contour (outermost contour) not included inside other contours. The contour extraction method may be any method, and for example, a method using an edge detection technique may be applied. The object detection module 125-2 detects a region surrounded by the obtained outermost contour as an object.

The classification module 126-2 classifies the plurality of detected objects into groups. For example, the classification module 126-2 classifies the plurality of objects into one or more groups such that a plurality of mutually similar objects belong to the same group. The similarity determination method may be any method, and for example, a method of determining similarity based on the similarity of the contour, a method of determining similarity based on the similarity of the image feature of each object, and the like may be applied.

The object extraction module 127-2 extracts the objects classified into the group from the repeated pattern PA.

The detection module 120-2 outputs the object extracted by the object extraction module 127-2 to the output control module 102 as an object included in the repeated pattern PA.

Figure 18:
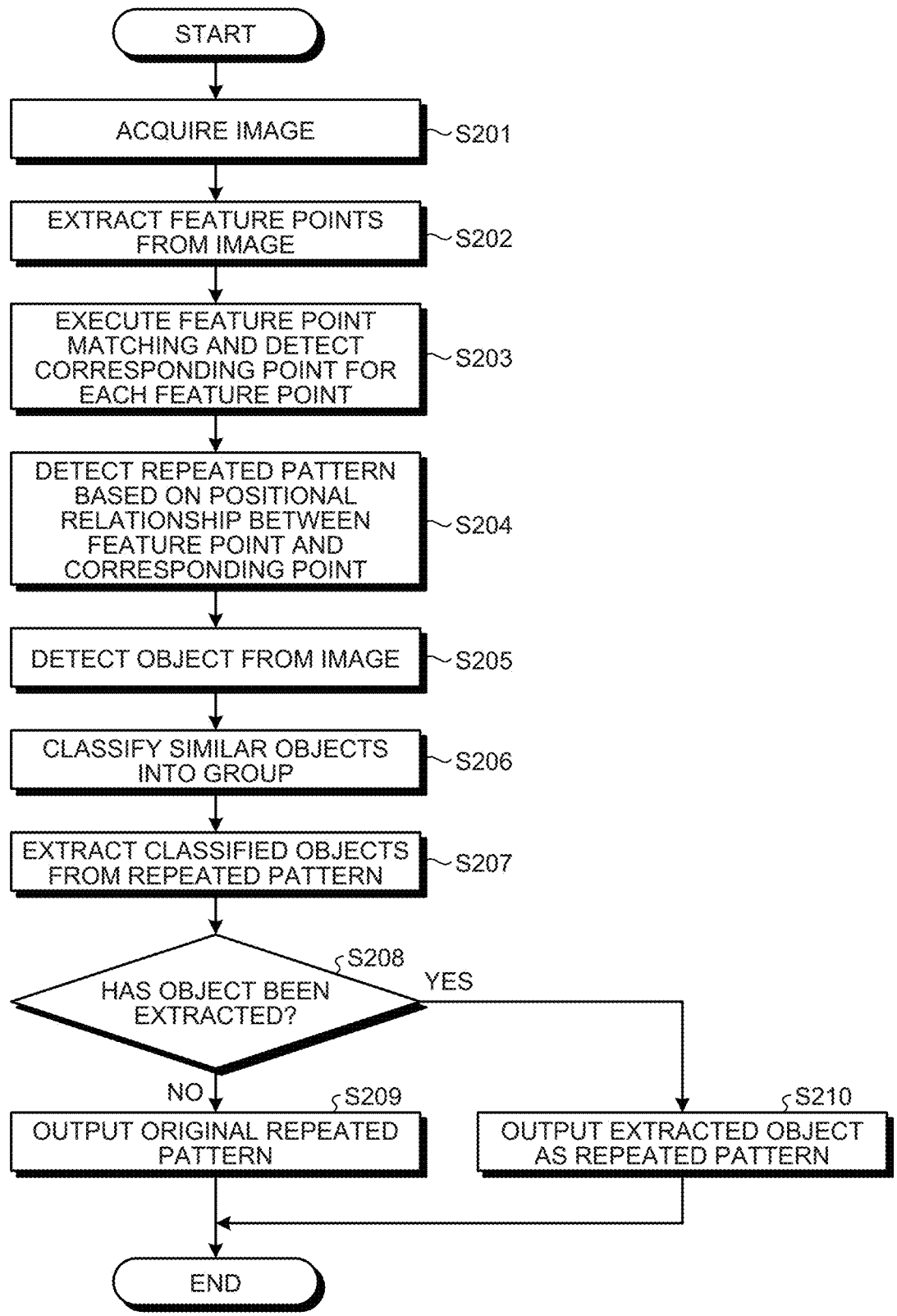
FIG. 18 is a flowchart illustrating an example of detection processing according to the second embodiment.

Next, detection processing by the image processing device 100-2 according to the second embodiment configured as described above will be described with reference to FIG. 18. FIG. 18 is a flowchart illustrating an example of detection processing according to the second embodiment.

Since steps S201 to S204 are the same as the steps S101 to S104 in the image processing device 100 according to the first embodiment, the description thereof will be omitted.

Figure 19:
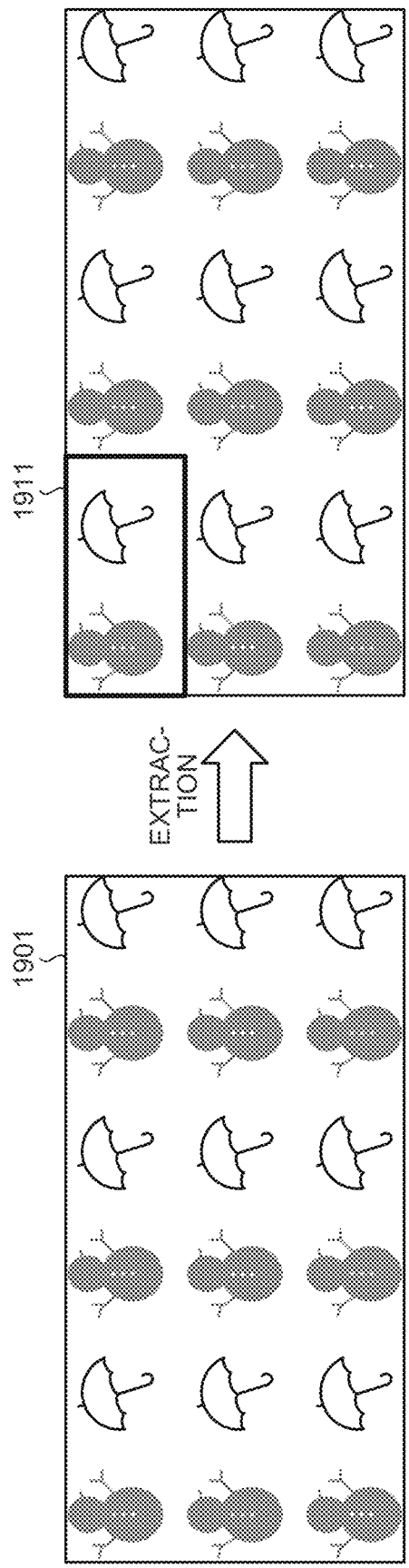
FIG. 19 is a diagram illustrating an example of detection processing of a repeated pattern PA according to the second embodiment.

FIG. 19 is a diagram illustrating an example of detection processing of the repeated pattern PA according to the present embodiment. A repeated pattern 1911 is detected from an image 1901 through the processing up to the step S204.

Figure 20:
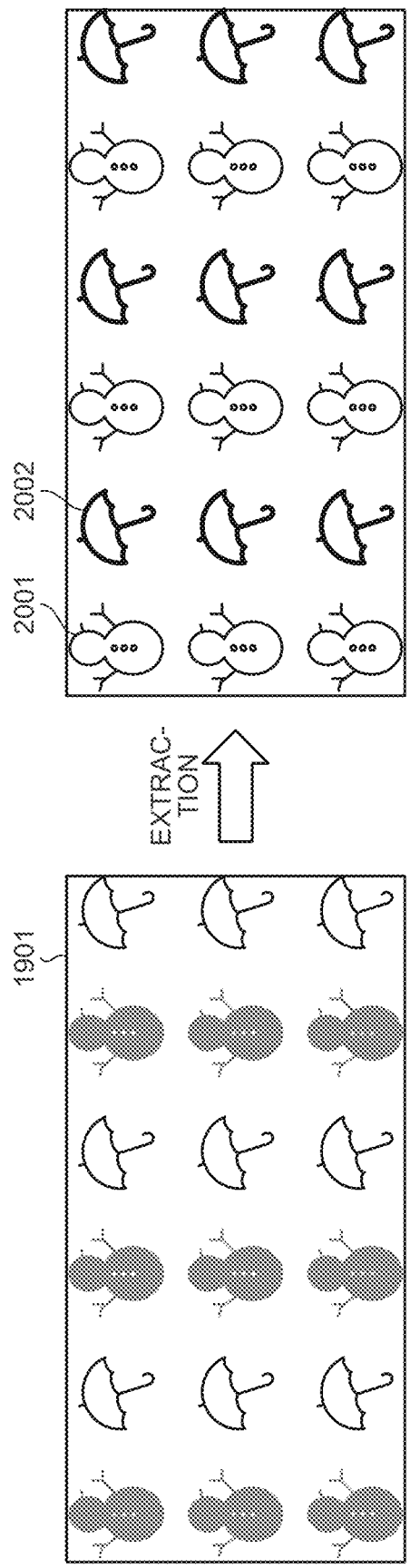
FIG. 20 is a diagram illustrating an example of object detection processing.

Returning to FIG. 18, the object detection module 125-2 detects a plurality of objects from the image acquired by the acquisition module 101 (step S205). FIG. 20 is a diagram illustrating an example of object detection processing. As illustrated in FIG. 20, a total of 18 objects including objects 2001, 2002 are detected by executing contour extraction processing on the image 1901.

Returning to FIG. 18, the classification module 126-2 classifies the plurality of detected objects into groups (step S206). In the example of FIG. 20, a plurality of objects (18 objects in the example of FIG. 20) are classified into two groups of a group having a similar shape as the object 2001 and a group having a similar shape as the object 2002.

The classification module 126-2 may discard objects having a small number (for example, the number of objects is smaller than the lower limit value) without classifying the objects into groups. This makes it possible to avoid detection of an object that does not constitute a repeated pattern.

Figure 21:
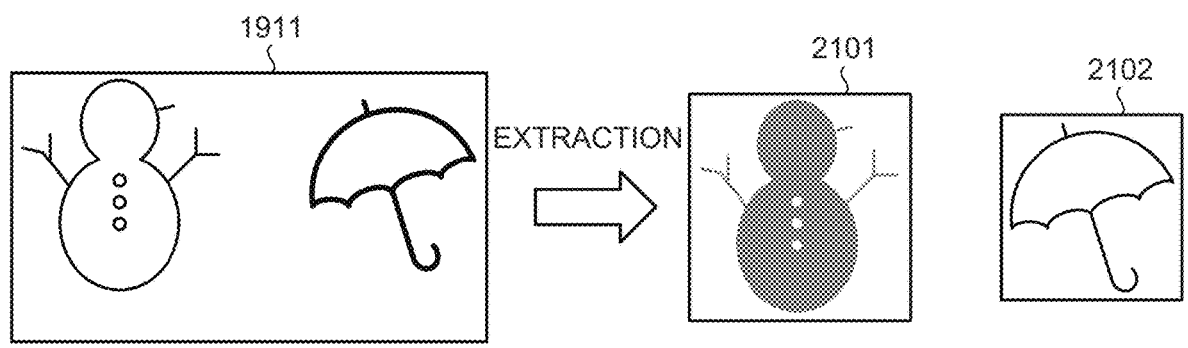
FIG. 21 is a diagram illustrating an example of object extraction processing.

The object extraction module 127-2 extracts the objects classified into the group from the repeated pattern PA (step S207). FIG. 21 is a diagram illustrating an example of object extraction processing. FIG. 21 illustrates an example in which an object 2101 corresponding to the object 2001 and an object 2102 corresponding to the object 2002 are extracted from the repeated pattern 1911.

Returning to FIG. 18, the detection module 120-2 determines whether or not an object has been extracted (step S208). When no object is extracted (step S208: No), the output control module 102 outputs the repeated pattern PA as it is (step S209). When an object is extracted (step S208: Yes), the output control module 102 outputs the extracted object as the repeated pattern PB (step S210) and ends the detection processing.

In this manner, in the image processing device according to the second embodiment, the objects included in an image are detected and classified into groups, and among the classified objects, an object included in a repeated pattern is detected as an object that may be a more detailed repeated pattern. This enables a repeated pattern to be detected with improved accuracy.

Figure 22:
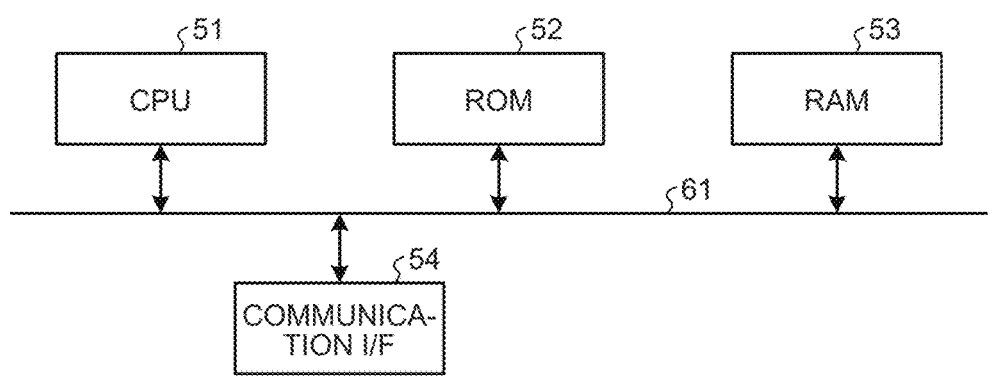
FIG. 22 is an explanatory diagram illustrating a hardware configuration example of the image processing device according to the first or second embodiment.

Next, a hardware configuration of the image processing device according to the first or second embodiment will be described with reference to FIG. 22. FIG. 22 is an explanatory diagram illustrating a hardware configuration example of the image processing device according to the first or second embodiment.

The image processing device according to the first or second embodiment includes a control device such as a central processing unit (CPU) 51, a storage device such as a read only memory (ROM) 52 or a random access memory (RAM) 53, a communication I/F 54 that is connected to a network and performs communication, and a bus 61 that connects each unit.

The program executed by the image processing device according to the first or second embodiment is provided by being incorporated in the ROM 52 or the like in advance.

The program executed by the image processing device according to the first or second embodiment may be provided as a computer program product by being recorded in a computer-readable recording medium such as a compact disk read only memory (CD-ROM), a flexible disk (FD), a compact disk recordable (CD-R), or a digital versatile disk (DVD) as a file in an installable format or an executable format.

The program executed by the image processing device according to the first or second embodiment may be stored on a computer connected to a network such as the Internet and provided by being downloaded via the network. The program executed by the image processing device according to the first or second embodiment may be provided or distributed via a network such as the Internet.

The program executed by the image processing device according to the first or second embodiment may cause a computer to function as each unit of the image processing device described above. In this computer, the CPU 51 can read a program from a computer-readable storage medium onto a main storage device and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising:
one or more processors configured to:
acquire an image;
detect a first repeated pattern from the image;
divide the first repeated pattern into a plurality of partial images;
execute image processing on a first partial image included in the plurality of partial images, and output a processed image;
perform matching between feature points of a second partial image included in the plurality of partial images and feature points of the processed image, and detect similar feature points as corresponding points;
determine whether or not the first partial image and the second partial image are repeated patterns based on relative positional relationships between the corresponding points and the corresponding feature points;
detect the first partial image and the second partial image determined as repeated patterns, as an object included in the first repeated pattern; and
output the object as a second repeated pattern.

2. The image processing device according to claim 1, wherein
the one or more processors are configured to divide the first repeated pattern into a plurality of partial images by changing the number of divisions when there is no second partial image determined as a repeated pattern.

3. The image processing device according to claim 1, wherein
each of the feature points is represented by a feature including a value indicating a scale, and
the one or more processors are configured to determine a scale ratio of the partial image to be divided, in accordance with a ratio between the scale included in the feature representing the feature point and a scale included in a feature representing the corresponding point.

4. The image processing device according to claim 1, wherein
the image processing includes at least one of processing of vertically inverting the first partial image, processing of horizontally inverting the first partial image, and processing of rotating the first partial image.

5. The image processing device according to claim 4, wherein
the image processing includes processing of rotating the first partial image, and
the one or more processors are configured to determine a rotation angle based on the relative positional relationships between the feature points and the corresponding points, and to rotate the first partial image at the determined rotation angle.

6. The image processing device according to claim 1, wherein
one or more processors are configured to:
correct a positional shift between the first partial image and the second partial image determined as repeated patterns; and
detect the first partial image and the second partial image whose positional shift has been corrected as the object included in the first repeated pattern.

7. An image processing device comprising:
one or more processors configured to:
acquire an image;
detect a first repeated pattern from the image;
detect a plurality of objects from the image;
classify objects similar to each other among the plurality of objects into a group;
extract the objects classified into the group from the first repeated pattern; and
output the extracted objects as a second repeated pattern that is a more detailed repeated pattern than the first repeated pattern.

8. An image processing method comprising:
acquiring an image;
detecting a first repeated pattern from the image;
dividing the first repeated pattern into a plurality of partial images;
executing image processing on a first partial image included in the plurality of partial images, and outputting a processed image;
performing matching between feature points of a second partial image included in the plurality of partial images and feature points of the processed image, and detecting similar feature points as corresponding points;
determining whether or not the first partial image and the second partial image are repeated patterns based on relative positional relationships between the corresponding points and the corresponding feature points;
detecting the first partial image and the second partial image determined as repeated patterns, as an object included in the first repeated pattern; and
outputting the object as a second repeated pattern.

9. A computer program product comprising a non-transitory computer-readable storage medium including programmed instructions, the instructions causing a computer to execute:
acquiring an image;
detecting a first repeated pattern from the image;
dividing the first repeated pattern into a plurality of partial images;
executing image processing on a first partial image included in the plurality of partial images, and outputting a processed image;
performing matching between feature points of a second partial image included in the plurality of partial images and feature points of the processed image, and detecting similar feature points as corresponding points;
determining whether or not the first partial image and the second partial image are repeated patterns based on relative positional relationships between the corresponding points and the corresponding feature points;
detecting the first partial image and the second partial image determined as repeated patterns, as an object included in the first repeated pattern; and
outputting the object as a second repeated pattern.

10. An image processing device comprising:
one or more processors configured to:
acquire an image;
extract a plurality of feature points from the image;
perform matching for each of the plurality of feature points with other feature points to detect similar feature points as corresponding points; and
detect a repeated pattern included in the image based on relative positional relationships between the corresponding points and the corresponding feature points, wherein
each of the feature points is represented by a feature including a value indicating a direction, and
the one or more processors are configured to perform the matching between feature points among the plurality of feature points having a difference smaller than a threshold, the difference being a difference between the values indicating the directions.

11. An image processing method comprising:
acquiring an image;
extracting a plurality of feature points from the image;
performing matching for each of the plurality of feature points with other feature points to detect similar feature points as corresponding points; and
detecting a repeated pattern included in the image based on relative positional relationships between the corresponding points and the corresponding feature points, wherein
each of the feature points is represented by a feature including a value indicating a direction, and
the matching includes matching between feature points among the plurality of feature points having a difference smaller than a threshold, the difference being a difference between the values indicating the directions.

12. A computer program product comprising a non-transitory computer-readable storage medium including programmed instructions, the instructions causing a computer to execute:
acquiring an image;
extracting a plurality of feature points from the image;
performing matching for each of the plurality of feature points with other feature points to detect similar feature points as corresponding points; and
detecting a repeated pattern included in the image based on relative positional relationships between the corresponding points and the corresponding feature points, wherein
each of the feature points is represented by a feature including a value indicating a direction, and
the matching includes matching between feature points among the plurality of feature points having a difference smaller than a threshold, the difference being a difference between the values indicating the directions.

13. An image processing method comprising:
acquiring an image;
detecting a first repeated pattern from the image;
detecting a plurality of objects from the image;
classifying objects similar to each other among the plurality of objects into a group;
extracting the objects classified into the group from the first repeated pattern; and
outputting the extracted objects as a second repeated pattern that is a more detailed repeated pattern than the first repeated pattern.

14. A computer program product comprising a non-transitory computer-readable storage medium including programmed instructions, the instructions causing a computer to execute:
- acquiring an image;
- detecting a first repeated pattern from the image;
- detecting a plurality of objects from the image;
- classifying objects similar to each other among the plurality of objects into a group;
- extracting the objects classified into the group from the first repeated pattern; and
- outputting the extracted objects as a second repeated pattern that is a more detailed repeated pattern than the first repeated pattern.

* * * * *